(12) United States Patent
Oberle

(10) Patent No.: US 6,315,494 B1
(45) Date of Patent: Nov. 13, 2001

(54) SOIL REMEDIATION BY PERMANGANATE OXIDATION

(76) Inventor: Daniel W. Oberle, 5114 Maple Dr., Sylvania, OH (US) 43560

(*) Notice: Subject to any disclaimer, the term of this patent is extended or adjusted under 35 U.S.C. 154(b) by 0 days.

(21) Appl. No.: 09/695,335

(22) Filed: Oct. 24, 2000

(51) Int. Cl.[7] .......................... B09C 1/08; B09C 101/00
(52) U.S. Cl. ........................... 405/128.5; 405/128.7
(58) Field of Search ................. 405/128.1, 128.15, 405/128.45, 128.5, 128.7, 128.75; 588/248, 205, 206, 207, 218, 221, 224, 236

(56) References Cited

U.S. PATENT DOCUMENTS

| | | | |
|---|---|---|---|
| 3,946,081 | 3/1976 | Wedemeyer et al. | 260/597 R |
| 5,286,141 | 2/1994 | Vigneri | 405/128 |
| 5,370,801 | * 12/1994 | Sorensen et al. | 210/942 |
| 5,520,483 | 5/1996 | Vigneri | 405/128 |
| 5,525,008 | 6/1996 | Wilson | 405/128 |
| 5,562,588 | * 10/1996 | Higgins | 588/256 |
| 5,611,642 | 3/1997 | Wilson | 405/128 |
| 5,615,974 | 4/1997 | Land et al. | 405/128 |
| 5,700,107 | * 12/1997 | Newton | 405/128 |
| 5,741,427 | 4/1998 | Watts et al. | 210/747 |
| 5,766,929 | * 6/1998 | Orolin et al. | 435/262 |
| 5,849,201 | * 12/1998 | Bradley | 405/128 |
| 5,967,230 | 10/1999 | Cooper | 166/245 |
| 6,019,548 | 2/2000 | Hoag et al. | 405/128 |
| 6,036,849 | * 3/2000 | Rippetoe et al. | 405/128 |
| 6,102,621 | 8/2000 | Siegrist et al. | 405/128 |

FOREIGN PATENT DOCUMENTS

| | | | |
|---|---|---|---|
| 2291055-A | * | 1/1996 | (GB). |
| 2000-210683-A | * | 8/2000 | (JP). |

* cited by examiner

*Primary Examiner*—David Bagnell
*Assistant Examiner*—John Kreck

(57) ABSTRACT

The permanganate ion and an alkaline earth metal base of calcium and/or magnesium are distributed into the soil by a means of mechanical mixing to destroy contaminants in the soil and groundwater by chemical oxidation. The disclosed method produces a stable, post-treatment, manganese dioxide precipitate that does not adversely effect the ground water with high dissolved manganese concentrations. The permanganate salts may include potassium, magnesium or sodium permanganate, and the preferred alkaline earth metal bases may include calcium oxide, calcium hydroxide, magnesium oxide and magnesium hydroxide. Dolomite quick lime may be used to supply an inexpensive source of the desired calcium and/or magnesium base. The calcium and/or magnesium base may be added before, during or after the addition of the permanganate salt.

12 Claims, 1 Drawing Sheet

SOIL REMEDIATION BY PERMANGANATE OXIDATION

CROSS-REFERENCE TO RELATED APPLICATIONS

Not Applicable.

STATEMENT REGARDING FEDERAL RESEARCH AND DEVELOPMENT

Not Applicable.

BACKGROUND—Field of Invention

A method for remediation of contaminants in soil and/or ground water by permanganate oxidation that achieves post-treatment secondary drinking water standards for dissolved manganese in ground water as established by the United States Environmental Protection Agency (USEPA).

BACKGROUND—Description of Prior Art

An October 1989 Public Health Statement from the Agency for Toxic Substances and Disease Registry Recent suggested that up to 34 percent of U.S. water sources are contaminated with chlorinated alkenes such as perchloroethylene (PCE), trichloroethylene (TCE), dichloroethylene (DCE) and vinyl chloride (VC). Recent news reports and investigations also suggest that oxygenated fuel supplements like methyl-tert-butyl ether (MTBE) have adversely affected our ground water supplies. These chemicals are classified as recalcitrant compounds because they are difficult to treat with conventional remediation technologies. However, testing has demonstrated that chemical oxidation processes may work well for the treatment of these contaminants.

The process of chemical oxidation for remediation purposes involves the injection of oxidizing chemicals into the soil and/or ground water to destroy or oxidize contaminants in place. Although chemical oxidation processes have been studied and publicized for decades in the field of organic chemistry, the use of chemical oxidation for remediation applications is limited to the past decade. The most common chemicals used for in-situ chemical oxidation are hydrogen peroxide and Fenton's reagent. Fenton's reagent is a mixture of hydrogen peroxide and ferrous iron, usually prepared under low pH conditions. However, recent attention has focused on the potential use of permanganate salts as an oxidant for remediation purposes.

Permanganate salts are well-known oxidizing agents as they are commonly used in many water treatment applications at low concentrations. Over 30 percent of the surface water treatment plants in the United States and 20 percent of the ground water treatment plants use potassium permanganate for water treatment. The reaction mechanisms for permanganate oxidation have been published in several technical writing, including books by Stewart in 1964 and Lee in 1980.

As an oxidizer, permanganate has a unique affinity for destroying organic compounds that contain carbon-carbon double bonds. The permanganate ion is strongly attracted to the negative charge associated with electrons in the pi-cloud of carbon-carbon double bonds of chlorinated alkenes such as PCE, TCE, DCE and VC. The permanganate ion borrows electron density from the pi-bond, which disturbs the carbon-carbon double bond, thus forming a bridged oxygen compound known as the hypomanganate diester. This intermediate product is unstable and further reacts by a number of mechanisms including hydroxylation, hydrolysis or cleavage. The final oxidation product is carbon dioxide, chloride salt and manganese dioxide. Other contaminants like MTBE may be oxidized by free radical oxidation.

Although the reaction of the permanganate ion with contaminants is well understood, these reactions have not been commonly used for in-situ remediation due to complications that result from manganese dioxide which is formed as a precipitate of the reaction. Plugging of the soil matrix with manganese dioxide has been observed when permanganate salts are injected into the soils through injection wells or points. This plugging results in poor contact of the oxidizing agent with the contaminants of concern, resulting in inefficient treatment due to channeling of the oxidant in the subsurface. Injuries to workers have occurred from the pressure build-up caused by injection techniques. Injection techniques have also been found to be ineffective in some cases where globules of contamination exist in the subsurface because the globules become encrusted with manganese dioxide precipitate, thus preventing further oxidant contact. Finally, the manganese dioxide precipitates that form from the reaction are unstable as they are readily reduced by chemical or biological in-situ processes to form soluble divalent manganese ions.

Dissolved manganese adversely affects the taste and color of ground water at elevated concentrations. The United States Environmental Protection Agency (EPA) has established a secondary drinking water standard of 50 ug/l for dissolved manganese. However, post-treatment analyses have shown that manganese concentrations in the ground water may exceed the USEPA secondary drinking water standards by more than 100-fold after permanganate remediation is completed. Manganese dioxide plugging, dangerous injection pressures, inadequate chemical contact, chemical channeling and elevated dissolved manganese concentrations have all limited the use and regulatory acceptance of permanganate oxidation as a remediation tool.

Review of Existing Patents

Several patents for in-situ chemical oxidation remediation have been issued during the past decade. Examples include Chem-Ox (Mantech) U.S. Pat. Nos. 5,520,483 and 5,286,141, Method and system for remediation of groundwater contamination, February 1994 and May 1996; Geo-Cleanse U.S. Pat. Nos. 5,525,008 and 5,61,642, Remediation apparatus and method for organic contamination in soil and groundwater, June 1996 and March 1997; Terra Vac U.S. Pat. No. 5,615,974, Process for Soil Decontamination by Oxidation and Vacuum Extraction, April 1997; Richard Watts, U.S. Pat. No. 5,741,427, Soil and/or groundwater remediation process, April 1998.; Kent Cooper, U.S. Pat. No. 5,967,230, In situ water and soil remediation method and system, October 1999; Hoag, et al, U.S. Pat. No. 6,019,548, Chemical oxidation of volatile organic compounds, February 2000 and Siegrist, et al, U.S. Pat. No. 6,102,621, Oxidative particle mixtures for groundwater treatment, August 2000.

The majority of these patents refer to free-radical oxidation methods that use hydrogen peroxide as the oxidizing agent for contaminant destruction. The CleanOX U.S. Pat. No. 5,286,141 primarily covers the injection of hydrogen peroxide into "mutually spaced wells" for the in situ remediation of hydrocarbon compounds. The patent includes various dependant claims to cover a variety of injection volumes, pressures and injection ratios. The CleanOX 5,520,483 patent is a continuation-in-part of the U.S. Pat. No.

5,286,141 which addresses Fenton's oxidation (i.e. the injection of acid and ferrous iron into the groundwater prior to the injection of hydrogen peroxide). Both of these patents differ from the present invention because they involve the injection of hydrogen peroxide as the oxidizing agent to induce free-radical oxidation. The GeoCleanse, Richard Watts and Kent Cooper patents also involve the injection of a hydrogen peroxide into the subsurface for remediation purposes, with various enhancements to the liquid injection process and application techniques. The patents do not pertain to permanganate oxidation, nor do they address a method of treatment that achieves USEPA secondary drinking water standards for dissolved manganese.

The Terra Vac patent (U.S. Pat. No. 5,615,974) covers the injection of oxidizing agents into the subsurface for in situ oxidation of contaminants when used in combination with vacuum extraction wells. Potassium permanganate is listed as a potential oxidant in the patent specifications. However, the patent differs from the current invention because it focuses on oxidation to reduce contaminants into smaller, volatile compounds that are recoverable by the use of vapor extraction wells. The Terra Vac patent involves liquid injection techniques that could result in potentially unsafe injection pressures and inefficient chemical channeling in the subsurface. Finally, the Terra Vac patent does not incorporate an alkaline earth metal base to prevent elevated post-treatment concentrations of dissolved manganese in the ground water.

The Hoag patent (U.S. Pat. No. 6,019,548) discloses a method of injecting two oxidants into the subsurface to oxidize natural organics in the soil as well as the contaminants. The Hoag patent involves fluid injection techniques, incorporating an initial injection of persulfate solution to reduce the oxidant demand of the native soils. The reduced oxidant demand is reported to reduce pore-space plugging from manganese dioxide during injection. However, it does not resolve the problems associated with dangerous injection pressures or inefficient chemical channeling in the subsurface from liquid injection. It also fails to provide a method of achieving post-treatment dissolved manganese concentrations in the ground water that meet the USEPA secondary drinking water standards. Thus, application of the Hoag patent may result in elevated concentrations of dissolved manganese and sulfate in the ground water down-gradient of the treatment area.

Finally, the Siegrist patent (U.S. Pat. No. 6,102,621) involves the injection of oxidants into the subsurface at elevated pressures. The injection of the oxidant is accomplished in granular form through a method of hydraulic soil fracturing. Potassium permanganate and sodium permanganate are listed as potential oxidants for use with the patent. The Siegrist patent discloses a method of injecting the oxidants into the subsurface inside a hydrophilic carrier fluid. The method focuses on high-pressure injection techniques that fracture the soils and inject the carrier fluid into the resulting fractures. High efficiency treatment may occur in the channels, but the uniform treatment created by mixing the chemicals into the soil is not achieved. The hydrophilic carrier fluids include cements, silicates and clay, but do not include the calcium and/or magnesium bases of oxide and/or hydroxide. Most important, the patent does not provide a means for achieving USEPA secondary drinking water standards for manganese in ground water after the treatment is completed.

SUMMARY

The present invention presents a method to perform in-situ or ex-situ remediation of contaminants using permanganate and an alkaline earth metal base of calcium and/or magnesium to produce post-treatment concentrations of dissolved manganese in the ground water that meet USEPA secondary drinking water standards.

Objects and Advantages

Accordingly, several objects and advantages of my invention are:

(a) the invention provides a means of oxidizing contaminants in the subsurface using permanganate chemical oxidation without experiencing the adverse affects of formation plugging through the utilization of mixing techniques rather than liquid injection techniques;

(b) the invention provides a means of oxidizing contaminants in the subsurface using permanganate chemical oxidation without creating dangerous injection pressures that have injured workers at some remediation sites;

(c) the invention provides a means of oxidizing contaminants in the subsurface using permanganate chemical oxidation without the problem of chemical channeling that is associated with liquid injection techniques;

(d) the invention provides a means of oxidizing globules of contaminant in the subsurface with permanganate chemical oxidation while limited problems of manganese dioxide encrustation of contaminant globules due to the contact efficiencies associated with the required mixing techniques;

(e) the invention provides a means of oxidizing contaminants in the subsurface using permanganate chemical oxidation without creating elevated post-treatment dissolved manganese concentrations that exceed USEPA secondary drinking water standards; and (f) the invention provides a means of coagulating colloidal manganese dioxide precipitates in the soil to prevent colloidal manganese from migrating out of the treatment zone where it can dissolve into an aqueous state.

Further objects and advantages of my invention will become apparent from a consideration of the drawings and ensuing description.

BRIEF DESCRIPTION OF THE DRAWING

A complete understanding of the present invention may be obtained by reference to the accompanying drawing, when considered in conjunction with the subsequent detailed description. FIG. 1 shows a detailed flowchart of the process in which:

Figure 1:
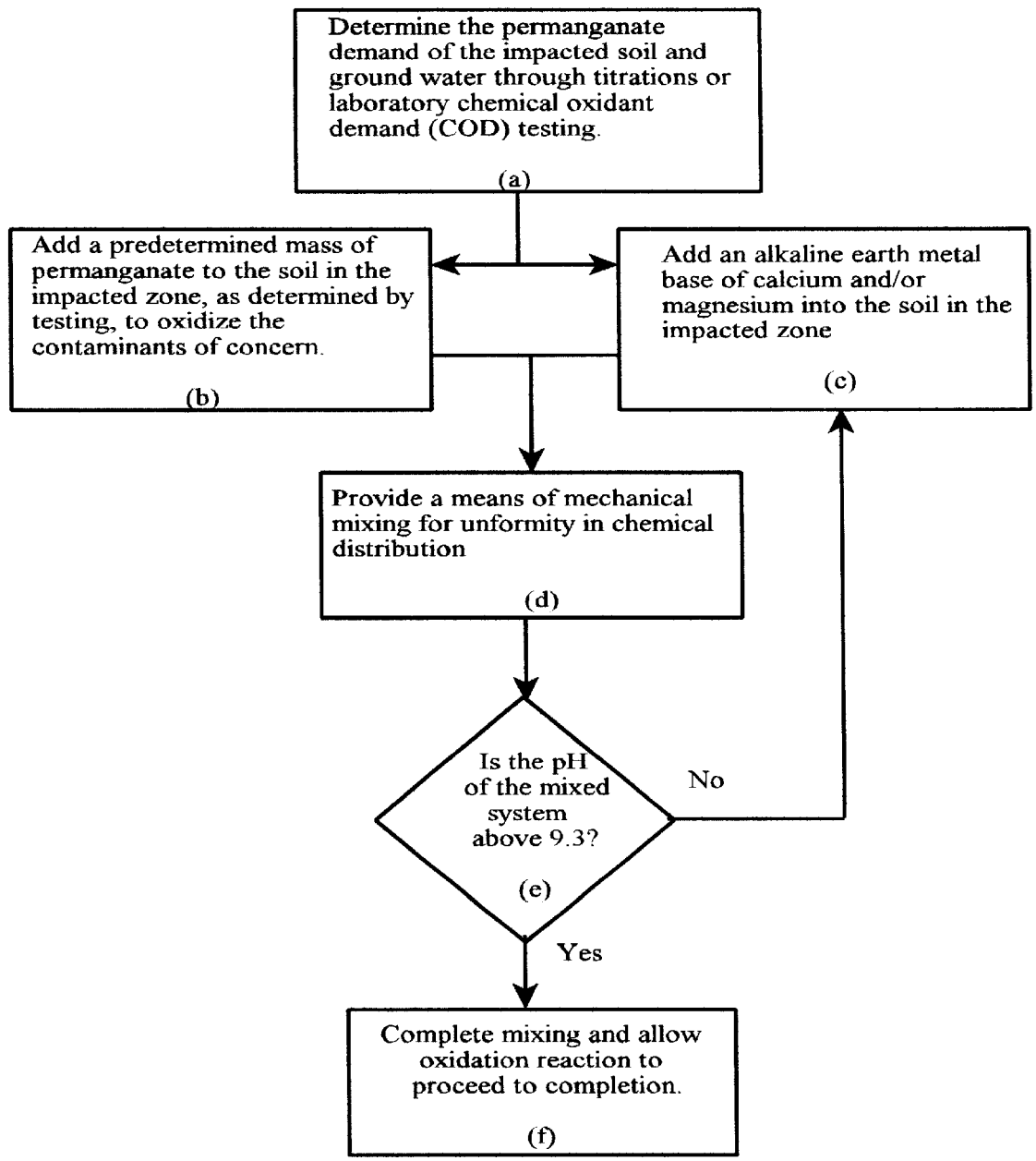

(a) The chemical oxidation demand of the soil and ground water system is first determined through the use of potassium permanganate titrations or laboratory chemical oxidation demand (COD) testing.

(b) A predetermined mass of permanganate, as determined by permanganate titrations or laboratory COD results, is added to the soil above or below the water table in the impacted zone to oxidize the chemicals of concern.

(c) An alkaline earth metal base of calcium and/or magnesium is added to the soil, either above or below the water table, in the impacted zone.

(d) The permanganate and alkaline earth metal base are distributed into the soils by a means of mechanical mixing.

(e) After the chemicals have been mixed into the soil, the pH of the mixed system is monitored. If the pH of the mixed system is below 9.3, then additional alkaline earth metal base must be added to the soil and mixing of the system must be repeated. If the pH is above 9.3, then the pH value indicates that the treatment chemicals have been uniformly distributed into the soil at an adequate concentration.

(f) When pH testing shows that the pH of the mixed system is above 9.3, then the soils may be left in place for the desired oxidation reactions between the permanganate ion and the contaminants of concern to occur.

DESCRIPTION OF THE INVENTION

The present invention presents a method to perform in-situ or ex-situ remediation of contaminants in soil and/or ground water using the permanganate ion and an alkaline earth metal base. The permanganate ion and the alkaline earth metal base are distributed into the soil by a means of mechanical mixing to allow for the permanganate to destroy contaminants in the soil and/or groundwater by chemical oxidation. The disclosed method produces a stable, post-treatment, manganese dioxide precipitate that does not adversely effect the ground water with high dissolved manganese concentrations. The preferred permanganate salt is potassium permanganate due to cost and availability, but sodium permanganate or magnesium permanganate may also be used. The preferred alkaline earth metal bases are calcium oxide, calcium hydroxide, magnesium oxide and magnesium hydroxide. Dolomite quick lime, either hydrated or unhydrated, may be used to supply an inexpensive source of the desired calcium and/or magnesium bases. The calcium and/or magnesium base may be added before, during or after the addition of the permanganate salt. The steps of the process are as follows:

Step 1: The chemical oxidation demand of the soil and ground water system is first determined through the use of potassium permanganate titrations or laboratory chemical oxidation demand (COD) testing. Laboratory titrations are completed by placing a known amount of soil and ground water into beaker with a known amount of potassium permanganate and allowing the chemicals to react for 24 hours. After the reaction is complete, a reducing agent is used to back-titrate the system until the residual permanganate color disappears. Laboratory COD values by the chromic acid method for soil and ground water may be used to calculate the permanganate oxidant demand, but the COD values must be multiplied by 2.5 to convert the oxygen demand into a value that reflects the true permanganate demand.

Step 2: The permanganate and alkaline earth metal base are added to the soils in any preferred addition order. The mass of permanganate necessary for the reaction, as determined by permanganate titrations or laboratory COD data, is added to the soil either above or below the water table in the impacted zone to oxidize the chemicals of concern. The alkaline earth metal base of calcium and/or magnesium is added to the soil either above or below the water table in the impacted zone. Typically, the required mass of the alkaline earth metal base of calcium and/or magnesium should be no more than three percent of the mass of the impacted soil.

Step 3: The permanganate and alkaline earth metal base are distributed into the soils by a means of mechanical mixing. The mixing may be performed in-situ or ex-situ. It may be performed by means of a backhoe, excavator, auger or similar means of mechanical mixing. If mixing of the entire soil system is not feasible due an overlying structure, the permanganate and alkaline earth metal base may be mixed at a predetermined ratio and then placed into the subsurface into a boring or excavation. Testing has shown that the addition order of the treatment chemicals does not effect the efficiency or outcome of the desired chemical reactions.

Step 4: After the chemicals have been mixed into the soil, the pH of the mixed system may be tested by measuring the pH of ground water in immediate contact with the mixed soils, or by placing 10 grams of soil into 100 milliliters of deionized water and testing the pH of the mixture after mixing the soil and water for 15 to 30 minutes. If the pH of the mixed system is below 9.3, then additional alkaline earth metal base must be added to the soil and mixing of the system must be repeated. If the pH is above 9.3, then the pH value indicates that the treatment chemicals have been uniformly distributed into the soil for treatment. The soils may then be left in place for the desired oxidation reactions to occur between the permanganate ion and the contaminants of concern. As the permanganate ion reacts with the contaminants of concern, the permanganate ion is reduced to the manganate ion. The presence of an alkaline earth metal base prevents the reduced manganate ions from dissolving into the ground water, thereby protecting the ground water to assure that down-gradient USEPA secondary drinking water standards for manganese are not exceeded after the reaction is complete. Furthermore, the divalent cations from the calcium and magnesium act as coagulants to reduce the suspension of colloidal manganese dioxide in the ground water. This reduces the potential for colloidal transport of manganese dioxide outside of the treatment zone where it can later dissolve.

Experiments

Bench scale testing was performed to evaluate the oxidation performance of the permanganate ion when combined with a chemical base to produce a stable manganese dioxide precipitate that will not result in post-treatment excedences of the USEPA secondary drinking water standards for dissolved manganese.

Testing was initially performed to determine if the pH would adversely affect the reaction kinetics required for chemical oxidation in a remediation application. To evaluate the effects of pH, the testing was performed using potassium permanganate under acidic, neutral and basic conditions. Water samples were spiked with known concentrations of PCE, TCE, and DCE. Potassium permanganate sample solutions were prepared at a concentration of two percent and then adjusted to pH values of 3.0, 7.0, and 11.0. Samples of the test solutions were analyzed by gas chromatography after 2½ hours of reaction. The results of the analyses showed that the pH had little to no effect on the oxidation rate of chlorinated alkenes using potassium permanganate.

Testing was next first performed on a soil/water system using alkali metal bases of sodium and potassium to evaluate the pH stability of the bases in contact with soil and the post-treatment manganese dioxide precipitate. The alkali metal bases proved too strong for the application, resulting in rapid pH increases that were difficult to maintain below the RCRA regulatory levels of 12.5 for an in-situ treatment application. In addition, the rapid pH increase was typically followed by subsequent rapid pH decrease as the low molar volumes of hydroxide from the strong base were consumed by the manganese and soil/water system. This testing indicated that alkali metal bases would perform poorly as a stabilizing agent for manganese in a permanganate oxidation application. Testing was also performed using sodium bicarbonate as a chemical base. The sodium bicarbonate offered some pH stability, but later laboratory testing showed that it was unable to reduce the dissolved ground water concentrations to below the USEPA secondary drinking water standards.

Next, testing was performed using the alkaline earth metal bases of magnesium and calcium. This testing included the bases of calcium oxide, calcium hydroxide, magnesium oxide and magnesium hydroxide. Testing indicated that these alkaline earth metal bases of calcium and magnesium provided the pH stability needed for the reaction. Dosages of one to three percent of the alkaline earth metal base to soil by weight were required for most soil systems to achieve sufficient pH stability. The testing with the alkaline earth metal bases also provided a dramatic improvement in the clarity of the water used in the soil/water system. It was determined that the divalent ions of calcium and magnesium served as coagulating agents which greatly reduced the amount of colloidal manganese dioxide in the water. This is a secondary benefit to the reaction since transport of manganese can also occur in the colloidal form.

Based on the successful results of the pH stability testing with the alkaline earth metal bases of calcium and magnesium, bench scale testing was performed to reduce the anticipated method to practice. In an initial confirmation test, nine 30-gram samples of sandy clay soil were treated with 0.6 grams of potassium permanganate to evaluate the post-treatment manganese solubility effects. Prior oxidant demand testing of the soil showed that the soil had a permanganate oxidant demand of approximately two percent by weight. The soil samples were placed into jars with 100 milliliters of deionized water to simulate saturated soil conditions in contact with ground water. One sample was not treated with an alkaline earth metal base so it could serve as the control group for the study. The remaining samples were treated with one and two percent alkaline earth metal base using four chemical bases (calcium oxide, calcium hydroxide, magnesium oxide and magnesium hydroxide). The samples were mixed for eight hours to allow the permanganate oxidation reaction to proceed to completion. Fifty milliliters of the decant water from each sample were then filtered through a 0.45-micron filter for analysis of dissolved manganese at an outside laboratory. The pH of the decant water was measured prior to filtering to evaluate the typical pH values of the well-mixed media. The pH values ranged from 9.3 S.I. to 12.3 S.I. Two hundred milliliters of deionized water were added to the fifty milliliters of solution to create a sufficient volume for laboratory testing. The dilution factor is accounted for in the tabulated results shown in Table 1.

TABLE 1

| Sample | pH of the Mixed Soil/ Water System | Manganese Concentration (mg/l) | Passes USEPA Secondary Drinking Water Standards? |
| --- | --- | --- | --- |
| Control Sample | 7.8 | 55 ug/l | No |
| 1% MgO | 9.6 | <50 ug/l | Yes |
| 2% MgO | 9.9 | <50 ug/l | Yes |
| 1% CaO | 11.1 | <50 ug/l | Yes |
| 2% CaO | 12.3 | <50 ug/l | Yes |
| 1% Mg(OH)$_2$ | 9.3 | <50 ug/l | Yes |
| 2% Mg(OH)$_2$ | 9.8 | <50 ug/l | Yes |
| 1% Ca(OH)$_2$ | 10.5 | <50 ug/l | Yes |
| 2% Ca(OH)$_2$ | 11.9 | <50 ug/l | Yes |

The results of the test showed that the disclosed method of remediation can achieve the secondary drinking water standards for manganese after treatment. However, the low permanganate concentrations and dilution factors made it difficult to determine the true efficiency of the method. Therefore, a second test was performed in which larger quantities of soil, permanganate, alkaline earth metal base and water were used.

Purified calcium hydroxide, calcium oxide, magnesium hydroxide and magnesium oxide can be costly in a full-scale treatment application. As an alternative, a mixture of these alkaline earth metal bases can be readily obtained at lower cost in the form of a dolomite quicklime. Dolomite quicklime was therefore used to provide the alkaline earth metal demand for the second test.

For the second test, four 120-gram samples of sandy clay soil were treated with 2.5 grams of potassium permanganate. The soil samples were placed into jars with 400 milliliters of deionized water to simulate saturated soil conditions in contact with ground water. Again, one sample was not treated with an alkaline earth metal base so it could serve as the control group for the study. The remaining three samples were treated with one, two and three percent dolomite quick lime. The samples were mixed for forty-eight hours to allow the permanganate oxidation reaction to proceed to completion. The pH values of the mixed solutions were tested after the reaction was complete. The pH values ranged from 10.4 S.I. to 12.4 S.I. Two hundred milliliters of the decant water from each sample was then filtered through a 0.45-micron filter for analysis of dissolved manganese at an outside laboratory. The analytical results from the outside laboratory are tabulated in Table 2.

TABLE 2

| Sample | pH of the Mixed Soil/ Water System | Manganese Concentration (mg/l) | Passes USEPA Secondary Drinking Water Standards? |
| --- | --- | --- | --- |
| Control Sample | 7.8 | 60 ug/l | No |
| 1% Quicklime | 10.4 | <10 ug/l | Yes |
| 2% Quicklime | 11.7 | <10 ug/l | Yes |
| 3% Quicklime | 12.4 | <10 ug/l | Yes |

Although the clayey soils appear to have provided some natural ion exchange capacity for the manganese., secondary drinking water standards were still not achieved in the sample not treated with an alkaline earth metal base.

CONCLUSION, RAMIFICATIONS, AND SCOPE

The results of the process testing showed that ordinary permanganate oxidation of soil and ground water systems results in dissolved manganese concentrations that exceed USEPA secondary drinking water standards. However, samples treated with an alkaline earth metal base of calcium and/or magnesium achieved the USEPA secondary drinking water standards for dissolved manganese. Therefore, this testing confirms that the disclosed method for permanganate oxidation provides a new and beneficial method for remediation of contaminants in soils and ground water without adversely affecting the ground water with elevated concentrations of dissolved manganese down-gradient of the treatment zone.

I claim:

1. A method for remediating contaminants in soil and groundwater by chemical oxidation with the permanganate ion, comprising the steps of:

a. introducing a predetermined amount of permanganate into the soil above or below the water table, and b. introducing an alkaline earth metal base of calcium and/or magnesium into the soils above or below the water table, and c. mixing said permanganate and alkaline earth metal base into the soils to achieve a post treatment soil pH value in the range of 9.3 to 12.4 S.I.

2. The method as in claim 1, wherein said permanganate is added at a concentration that meets the stoichiometric oxidant demand of the soil and groundwater as determined by oxidant demand titrations.

3. The method as in claim 1, wherein said permanganate is added at a concentration that meets the stoichiometric oxidant demand of the soil and groundwater as determined by laboratory analyses for chemical oxidation demand.

4. The method as in claim 1, wherein the addition of said alkaline earth metal base of calcium and/or magnesium is performed prior to addition of said permanganate.

5. The method as in claim 1, wherein said permanganate is added to the soils simultaneously with said alkaline earth metal base of calcium and/or magnesium.

6. The method as in claim 1, wherein said permanganate is comprised of a mixture of two or more of the compounds potassium permanganate, magnesium permanganate or sodium permanganate.

7. The method as in claim 1, wherein the alkaline earth metal base is a mixture of two or more of the compounds calcium hydroxide, magnesium hydroxide, calcium oxide or magnesium oxide.

8. The method as in claim 1, wherein the mixing of said permanganate and said alkaline earth metal base of calcium and/or magnesium is performed in-situ.

9. The method as in claim 1, wherein the mixing of said permanganate and said alkaline earth metal base of calcium and/or magnesium is performed in an ex-situ soil pile.

10. The method as in claim 1, wherein the mixing of said permanganate and said alkaline earth metal base of calcium and/or magnesium is performed using an excavator or backhoe.

11. The method as in claim 1, wherein the mixing of said permanganate and said alkaline earth metal base of calcium and/or magnesium is accomplished with an auger.

12. A method as in claim 1, wherein said permanganate and said alkaline earth metal base of calcium and/or magnesium are mixed at the surface and subsequently placed into an excavation or borehole in the subsurface.

* * * * *